United States Patent [19]
Singh

[11] Patent Number: 6,154,194
[45] Date of Patent: Nov. 28, 2000

[54] DEVICE HAVING ADJUSTABLE TOUCH-BASED DISPLAY OF DATA

[75] Inventor: Mona Singh, Cary, N.C.

[73] Assignee: Ericsson Inc., Research Triangle Park, N.C.

[21] Appl. No.: 09/205,536

[22] Filed: Dec. 3, 1998

[51] Int. Cl.[7] ....................................... G09G 5/00
[52] U.S. Cl. .................. 345/131; 345/340; 345/342; 345/346
[58] Field of Search ..................... 345/115, 116, 345/127, 129, 131, 340, 341, 342, 346, 973, 974, 123

[56] References Cited

U.S. PATENT DOCUMENTS

| | | | |
|---|---|---|---|
| 5,634,064 | 5/1997 | Warnock et al. | 359/774 |
| 5,734,380 | 3/1998 | Adams et al. | 345/340 |
| 5,760,772 | 6/1998 | Austin | 345/342 |
| 5,838,318 | 11/1998 | Porter et al. | 345/342 |
| 5,905,476 | 5/1999 | McLaughlin et al. | 345/342 |
| 5,917,492 | 6/1999 | Bereiter et al. | 345/342 |
| 6,020,887 | 2/2000 | Loring et al. | 345/340 |
| 6,026,409 | 2/2000 | Blumenthal | 345/341 |
| 6,081,266 | 6/2000 | Sciammarella | 345/341 |

*Primary Examiner*—Richard A. Hjerpe
*Assistant Examiner*—Kimnhung Nguyen
*Attorney, Agent, or Firm*—Wood, Phillips, VanSanten, Clark & Mortimer

[57] ABSTRACT

A display control structure for a data storage device. The device includes a screen portion for visually displaying at least a part of two different virtual display pages of the data adjacent a separating line. The display control structure includes touch-responsive resizing areas adjacent to and on opposite sides of the separating line with oppositely pointing indicators which, when touched by a user, cause the device to move the separating line in the direction of the indicator in the touched resizing area. The resizing areas when touched by a user may also cause the device to move the separating line in response to movement of the user's touch in a direction perpendicular to the separating line. Scrolling areas extend from the resizing areas in opposite directions perpendicular to the separating line with bar indicators in each smaller than the scrolling areas. When touched by a user, the bar indicators cause the device to move the portion of the associated virtual display page displayed in the screen portion in response to movement of the user's touch in the generally perpendicular direction. The bar indicators may also have oppositely pointing indicators at opposite ends which, when touched by a user, cause the device to move the portion of the associated virtual display page displayed in the screen portion in the direction of the pointing indicator of the bar indicator touched. When touched between its opposite ends by a user, the device causes the portion of the associated virtual display page displayed in the screen portion to move in response to movement of the user's touch in the generally perpendicular direction in the associated scrolling area.

28 Claims, 3 Drawing Sheets

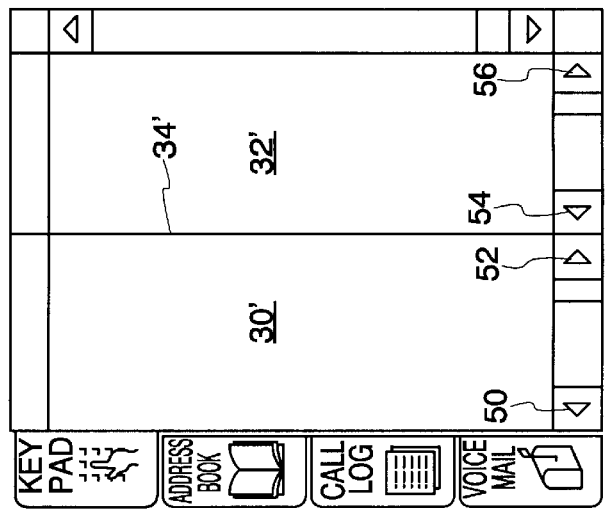
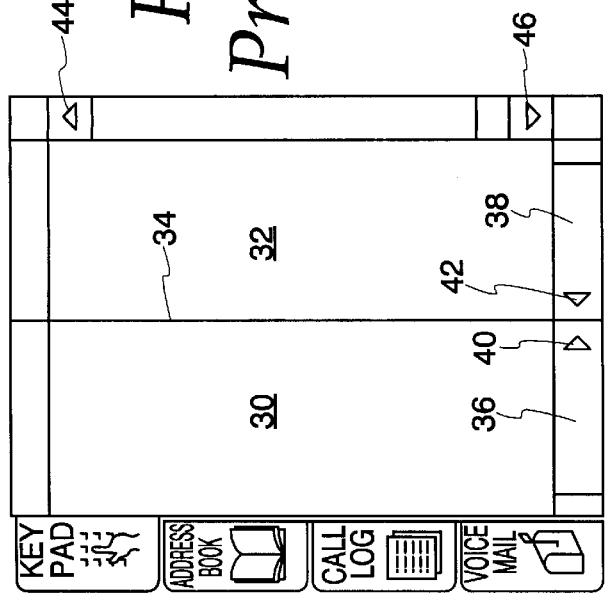
Fig. 1 Prior Art
Fig. 2 Prior Art
Fig. 3 Prior Art

DEVICE HAVING ADJUSTABLE TOUCH-BASED DISPLAY OF DATA

BACKGROUND OF THE INVENTION

1. Technical Field

The present invention is directed toward devices with data displays, and particularly toward touch-based display devices which simultaneously display two data pages.

2. Background Art

Devices which display different virtual pages of data are, of course, well known. (A "virtual page" as used herein refers to a two dimensional representation of data, where the two dimensions may be greater than the size of the portion of the screen available to display it so that only a portion of such data representation is visible in a display screen at a given time. In a database, each field may be visually represented by its own virtual page.) For example, personal computers can be used to display different data in different "windows", where the virtual pages of the data in one or more of the "windows" are larger than the windows. To view different portions of the virtual pages in the "windows", the user must scroll or pan through the page (where "scrolling" the virtual pages involves changing which portion of the data representation is visible on the display screen.) Also, where it is desirable to change the size of a "window", the user can "click and drag" a side of the "window" to change move that side and, effectively, change the size of the area displayed in that "window".

In some such prior art displays, particularly used with data tables, a single "window" may be provided but with several columns of data, with each column displayed only up to a line separating one column from an adjacent column. The user may use a mouse to "click and drag" these separating lines to increase the width of the display of one column and decrease the width of display of the adjacent column. Such a prior art display is shown in FIG. 1, in which a mouse can be used to position a cursor at the sides 20 of the column headings 22 to click and drag the sides 20 of the headings 22 and similarly change the width of the data column displayed therebeneath. As shown at side 20', a double pointing arrow has been displayed when the cursor is positioned at the side 20' whereby the mouse may be used to "click and drag" that side to change the width of the adjacent columns.

In addition to personal computers, however, small hand-held devices with display screens are becoming increasingly more common in a wide variety of uses. For example, small hand-held computers are common with small displays (commonly called "personal assistants" or "palm held computers"). Similar "communicators" having cellular communication capabilities and also having computer capabilities with small displays are also in use. Typically, these small portable devices do not and cannot conveniently have conventional input devices such as a mouse. Therefore, user interfaces such as described above with respect to FIG. 1, which have their own problems (e.g., resizing using the above are highly error-prone since users can often unintentionally cause a resize to occur and they can be difficult to control), are not at all suited for these devices.

In many such small devices, therefore, the small displays have touch-sensitive or touch-responsive display screens which sense when a certain area of the screen is touched and respond, typically by changing the display on the screen, based on the area of the screen which is touched.

With such small devices, however, there are significant limitations on how much data can be displayed on the screen. First, the limitation on the size of the screen itself (generally it must at least be smaller than the small device itself) can make it difficult if not often impossible to show the entire virtual page on the screen. Of course, even if the data could be shown in text size small enough to fit on the screen, it might be too small to be reliably read by the user (particularly given the relatively low resolution typically provided for such screens). Further, when two different groups of data are simultaneously shown (e.g., a table representation of data such as a list of names and associated phone numbers and/or addresses), the problem is exacerbated by the need to then fit two different virtual pages on the already small screen.

Given these problems, it is particularly important in such devices that the user be able to scroll over the virtual pages. It is also desirable to be able to resize the different areas in which the different virtual pages are displayed so that the user can focus on, and adequately see, a particular page at a given time depending upon the user's needs at that time.

To address the above, different touch-sensitive display controls have heretofore been used.

For example, as shown in FIG. 2, a touch-sensitive screen has been used to display portions of two different virtual pages 30, 32 adjacent one another along a separating line 34. Touch-sensitive areas 36, 38 are provided along the bottom of the displayed page portions with triangular arrow indicators 40, 42. By tapping the left area 36 (with the indicator 40 pointing to the right), a user can cause the separating line 34 to be moved to the right, thereby showing more of page 30 and less of page 32. Conversely, by tapping the right area 38 (with the indicator pointing to the left), a user can cause the separating line 34 to be moved to the left, thereby showing more of page 32 and less of page 30. Scrolling side-to-side in the pages 30, 32 (to see non-displayed portions to either side of the page portions displayed) is not readily permitted, however. Along the right side of the screen, touch-sensitive areas 44, 46 are provided and may be tapped by the user to cause the screen to simultaneously scroll up and down on both virtual pages.

Alternatively, as shown in FIG. 3, a touch-sensitive screen similarly has been used to display portions of two different virtual pages 30', 32' adjacent one another along a separating line 34'. Touch-sensitive areas 50, 52 and 54, 56 are provided beneath both of the pages 30', 32' to allow side-to-side scrolling in each page, and each may be tapped by the user to scroll left (tapping area 50 for page 30' or area 54 for page 32') or right (tapping area 52 for page 30' or area 56 for page 32'). A similar configuration is provided along the side of the page 32' for scrolling up and down on both virtual pages 30', 32' such as discussed above with respect to FIG. 2. Resizing the pages 30', 32' on the screen is not readily permitted, however.

While the FIGS. 2 and 3 prior art configurations work reasonably well as intended, they each have limitations as also mentioned. Further, it would be difficult to modify or combine those configurations to allow both scrolling and resizing given the conflicting desires to maximize page display areas and minimize screen areas taken up by such peripheral functions (i.e., the purpose of the screen is to convey information to the user through the displayed pages in the screen whereas the mentioned touch-sensitive areas are merely peripheral to that in that they simply help to select what is displayed). Of course, the desire to minimize the screen space used for the peripheral functions is also in conflict with the reality that the touch-sensitive areas for those functions must be large enough to accommodate users with large fingers. Peripheral functions cannot be squeezed into a small area without running the risk that many if not all users will have a difficult time pressing just exactly the right area to properly operating the device according to their wishes. Further, given that the many users of such devices will have widely varying computer skills, and may operate a particular device with widely varying familiarity for that particular device, it is important that all such peripheral functions be intuitive so that the user will readily understand what touching particular areas will do.

The present invention is directed toward overcoming one or more of the problems set forth above.

SUMMARY OF THE INVENTION

In one aspect of the present invention, a display control structure is provided for a data storage device. The data storage device includes a screen portion for visually displaying at least a part of two different virtual display pages of the data adjacent a separating line, the two virtual display pages when together adjacent the separating line being larger than the screen portion in a direction generally perpendicular to the separating line whereby only portion of one of the virtual display pages is displayed in the screen portion. The display control structure includes first and second touch-responsive resizing areas adjacent to and on opposite sides of the separating line with oppositely pointing indicators in the first and second resizing areas. When touched by a user, the resizing areas causes the device to move the separating line between pages in the screen portion in the direction of the indicator in the touched resizing area. The display control structure also includes a first scrolling area extending from the first resizing area in the generally perpendicular direction with a first bar indicator smaller than the first scrolling area in the generally perpendicular direction. When touched by a user, the first bar indicator causes the device to move the portion of the one virtual display page displayed in the screen portion in response to movement of the user's touch in the generally perpendicular direction in the first scrolling area.

In a preferred form of this aspect of the present invention, the first bar indicator is spaced from opposite sides of the first scrolling area by amounts which are proportionate to the amounts of the associated virtual display page not displayed in the screen portion.

In another preferred form, a second scrolling area is provided extending from the second resizing area in the generally perpendicular direction with a second bar indicator smaller than the second scrolling area in the generally perpendicular direction. When touched by a user, the second bar indicator causes the device to move the portion of the other virtual display page displayed in the screen portion in response to movement of the user's touch in the generally perpendicular direction in the second scrolling area.

In still another preferred form, the first and second touch-responsive resizing areas move in response to movement of the separating line.

In yet another preferred form, the first and second touch-responsive resizing areas when touched by a user also cause the device to move the separating line between pages in the visually displaying screen portion in response to movement of the user's touch in the generally perpendicular direction.

In a still further preferred form, the user touch is accomplished by physical contact of the user with the screen.

In another aspect of the present invention, a display control structure is provided for a data storage device. The data storage device includes a screen portion for visually displaying at least a part of two different virtual display pages of the data adjacent a separating line, the two virtual display pages when together adjacent the separating line being larger than the screen portion in a direction generally perpendicular to the separating line whereby only a portion of one of the virtual display pages is displayed in the screen portion. The display control structure includes first and second touch-responsive resizing areas adjacent to and on opposite sides of the separating line with oppositely pointing indicators in the first and second resizing areas. When touched by a user, the resizing areas cause the device to move the separating line between pages in the screen portion in the direction of the indicator in the touched resizing area. The display control structure also includes a first scrolling area extending from the first resizing area in the generally perpendicular direction. A first bar indicator in the first scrolling area has oppositely pointing indicators at opposite ends in the generally perpendicular direction and, when touched by a user, causes the device to move the portion of the one virtual display page displayed in the screen portion in the direction of the pointing indicator of the bar indicator touched.

In a preferred form of this aspect of the present invention, a second scrolling area extends from the second resizing area in the generally perpendicular direction, and a second bar indicator in the second scrolling area has oppositely pointing indicators at opposite ends in the generally perpendicular direction. When touched by a user, the second bar indicator causes the device to move the portion of the other virtual display page displayed in the screen portion in the direction of the pointing indicator of the bar indicator touched.

In another preferred form, when a bar indicator is touched between its opposite ends by a user, the device is caused to move the portion of the one virtual display page displayed in the screen portion in response to movement of the user's touch in the generally perpendicular direction in the associated scrolling area.

Preferred forms of the present invention as mentioned above in connection with the first aspect of the present invention may also be advantageously used with this aspect of the present invention.

In still other aspects of the present invention, a data storage device is provided including a memory for storing data displayable in at least two different virtual display pages, a display screen including a portion adapted to display at least a portion of each of the two different virtual display pages adjacent to one another at a separating line, and a display control structure such as explained above.

In a preferred form, the device is a hand-held portable communicator.

Other preferred forms of the display control structure as mentioned above may also be advantageously used with these aspects of the present invention.

It is an object of the invention to provide a data displaying device in which multiple virtual pages may be conveniently and reliably displayed.

It is another object to provide such a device which allows the user maximum flexibility to optimize the view of the virtual pages to best meet his needs.

It is still another object to provide such a device in which the display of the virtual pages may be resized and scrolled through in a practical, flexible, natural and intuitive manner.

It is yet another object of the invention to provide such a device in which resizing and scrolling can be accomplished with touch-responsive areas large enough to accommodate users with large hands while still taking minimal, narrow overall screen space.

BRIEF DESCRIPTION OF THE DRAWINGS

FIG. 1 is a screen displaying several different virtual pages of data according to one prior art configuration;

FIG. 2 is a screen displaying two different virtual pages of data according to another prior art configuration allowing lateral resizing of the pages;

FIG. 3 is a screen displaying two different virtual pages of data according to yet prior art configuration allowing lateral scrolling of the pages;

DESCRIPTION OF THE PREFERRED EMBODIMENT

Figure 4:
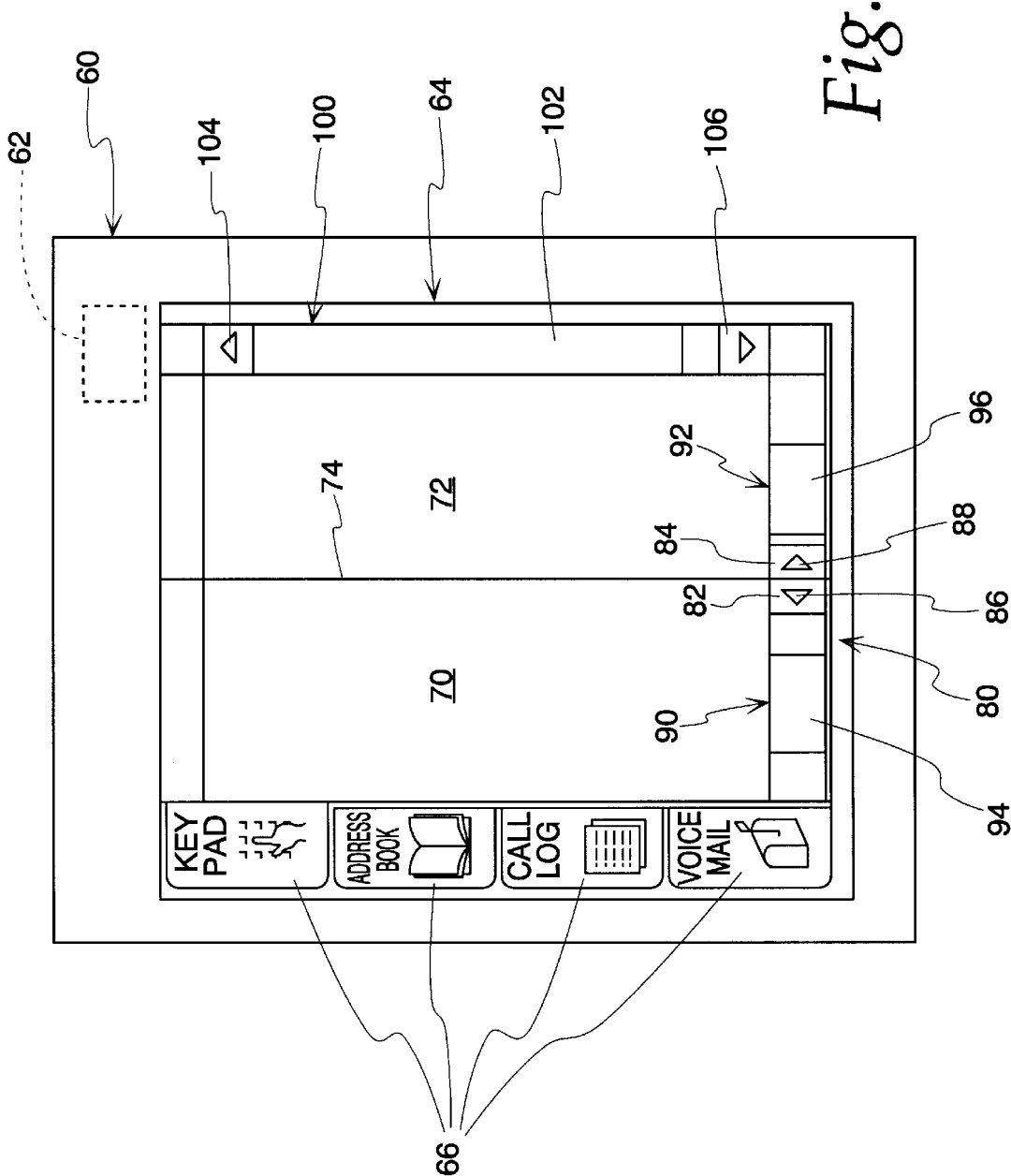
FIG. 4 is a simplified view of a device including the present invention.

A device 60 including a memory 62 for data and a screen 64 for displaying at least portions of virtual pages of the data is illustrated in FIG. 4. (As used herein, "data" refers to any kind of information which can be visually represented, and includes not only data which may be reproduced in tables, but also, for example, data which may be graphically represented in some manner, textual information [e.g., written information], pictures and illustrations, and virtually anything which can be visually displayed to convey something to the viewer.) The device 60 is preferably a portable hand-held type computer of some type, including particularly a communicator. For simplicity, other elements of the device 60 (e.g., a keypad, or a microphone or speaker as might be provided with a communicator) are not shown in the illustration.

In the illustrated embodiment, the screen 64 includes touch-pads (or touch-sensitive areas) or icons 66 which may be touched by the user to change between pages displayed in the screen 64. Those areas 66 may be dedicated to a particular purpose (e.g., touching the upper touch-pad 66 will always change the main portion of the screen 64 to display keypad associated virtual pages) or may be changeable based on what is displayed in the area when touched (i.e., the indication on the tab could be changed by the user in a suitable manner to display something other than "keypad", whereby touching the upper pad 66 when that something else is displayed would cause the device 60 to do something different still).

The touch-pads 66 are, in the preferred embodiment, a part of the screen 64. As is well known in the art, the screen 64 thus preferably includes not only a display structure but also suitable sensors associated therewith which are responsive to touching selected areas of the screen 64.

A preferably large portion of the screen 64 is used to display data. Specifically, in the configuration shown in FIG. 4, the device screen 64 includes two areas 70, 72, each for displaying different virtual pages, with the two page displaying areas 70, 72 adjacent one another along a vertically extending separating line 74. The separating line 74 may be displayed on the screen 64 as shown, although display of that line 74 is not required by the present invention.

Adjacent to and beneath the page displaying areas 70, 72 is the page display control 80 of the present invention. This control 80 is located in touch-responsive areas of the screen 64 so that, such as is known in the art, touching those areas will be recognized by the device 60 and interpreted to modify what is displayed in the page displaying areas 70, 72 as described below.

Specifically, touch-responsive resizing areas 82, 84 are located adjacent to and on opposite sides of the separating line 74 with oppositely pointing indicators 86, 88 in each area. Touching either resizing area 82, 84 will cause the separating line 74 to be moved in the direction of the indicator 86, 88 in the touched area 82, 84, thereby effectively resizing the two page displaying areas 70, 72. For example, by touching the left resizing area 82 having the left-pointing indicator 86, the separating line 74 will be moved to the left in the screen 64, thereby making page displaying area 70 narrower and page displaying area 72 wider. Conversely, by touching the right resizing area 84 having the right-pointing indicator 88, the separating line 74 will be moved to the right in the screen 64, thereby making page displaying area 70 wider and page displaying area 72 narrower.

In one preferred embodiment, the resizing areas 82, 84 will move the separating line 74 a selected distance (e.g., a set number of pixels) for each time one of the resizing areas 82, 84 is tapped. In this manner, fairly precise control of movement of the separating line 74 can be obtained without much risk of error.

Of course, it should also be recognized that other variations may also be used either separately or in combination with the above. For example, the device 60 may be set to recognize a continuous touching of one of the resizing areas 82, 84 to be equivalent to a repeated retouching of the areas, and therefore repeatedly move the separating line 74 until such touching stops.

Further, the area of the page display control 80 can be configured to recognize side-to-side movement of a user's touch after one of the areas 82, 84 have been touched and essentially "drag" the separating line 74 in response to such movement. Still further, the resizing areas 82, 84 could either remain in essentially the center of screen 64 such as shown in FIG. 4 or (preferably during drag movement of the separating line 74) could be caused to move side to side as the separating line moves side to side.

It should be recognized that resizing areas 82, 84 configured such as described above are highly intuitive in that most users would readily recognize what pressing on those areas 82, 84 would accomplish. The present invention provides excellent cues regarding the available functionality so that even first-time users would likely be able to operate the device 60 properly.

The page display control 80 of the present invention further includes two scrolling areas 90, 92, each scrolling area 90, 92 extending laterally away from the resizing areas 82, 84 in a lateral direction generally perpendicular to the separating line 74.

Displayed within the scrolling areas 90, 92 are scroll sliders or bar indicators 94, 96. Preferably the width of the bar indicators 94, 96 relative to the width of the scrolling areas 90, 92 is an indication of the width and horizontal/lateral position of the virtual page displayed in the directly above page displaying area 70, 72 relative to what is displayed in that page displaying area 70, 72. Thus, if substantially all of the width of the virtual page is displayed in the associated area 70, 72, then the associated bar indicator 94, 96 will be substantially as wide as its scrolling area 90, 92. Also, it is preferred that the position of the bar indicators 94, 96 within the scrolling areas 90, 92 be proportional to the relative position of what is displayed in the associated area 70, 72 to the overall virtual page being displayed in that area 70, 72. Thus, if the area 70, 72 displays all the way to the right edge of the associated virtual page and does not display the left portion of the page (i.e., the virtual page is shifted completely to the left), then the associated bar indicator 94, 96 is preferably displayed all the way to the left of its scrolling area 90, 92 and is spaced from the right end of its scrolling area 90, 92.

In the preferred embodiment shown in FIG. 4, the device 60 is configured so that the bar indicators 94, 96 when touched by a user cause the portion of the virtual display page shown in the associated area 70, 72 to change in response to lateral movement of the user's touch. Thus, the virtual page may be "dragged" to one side or the other to show different portions of the page according to the user's wish. By touching a bar indicator 94, 96 and then sliding his touching finger to the right, for example, a user would "drag" the virtual page to the right to essentially display those portions of the virtual page which were previously to the left of that displayed in the associated area 70, 72.

Figure 5:
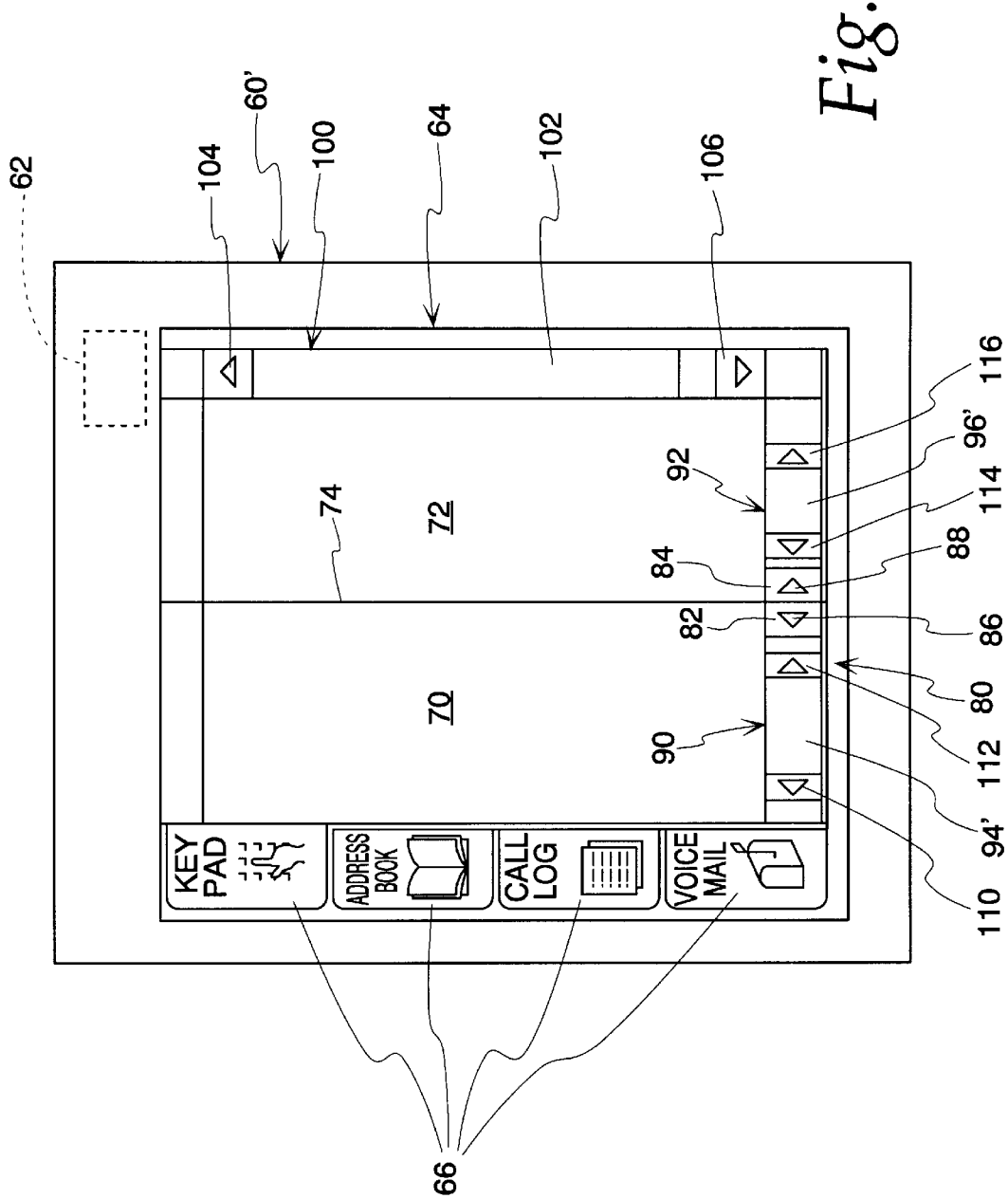
FIG. 5 is a simplified view of a device including an alternate embodiment of the present invention.

In an alternate preferred embodiment shown in FIG. 5, the bar indicators 94, 96 could also have arrows on opposite ends, with a user's touch of those ends causing the virtual page to essentially move in the direction of the arrow on the end touched.

Like the resizing areas 82, 84, these scrolling configurations are also highly intuitive in that most users would readily recognize what pressing on and/or dragging the bar indicators 94, 96 in the scrolling areas 90, 92 would accomplish. These configurations also provide excellent cues regarding the available functionality so that even first-time users would likely be able to also properly scroll within each page displaying area 70, 72 according to the user's needs. Moreover, the page display control 80 of the present invention as described above allows this control of sizing and scrolling to be accomplished in a small area (freeing up maximum area on the screen 64 for displaying data as is the primary object of the screen 64) while still allowing large enough spaces so that even large fingered people can properly operate and use the device 60.

In the device 60 displayed in FIGS. 4 and 5, a conventional touch-sensitive control 100 is provided for controlling vertical (i.e., up and down) scrolling of both virtual pages. With this, a bar indicator 102 similar to the bar indicators of the present invention is provided, and may be touched and "dragged" to scroll the virtual pages. Scroll areas 104, 106 with oppositely directed indicators are also provided at opposite ends of the control 100, and those areas may alternatively be tapped to vertically scroll the virtual pages in the areas 70, 72 a selected amount (i.e., a set number of pixels) for each tap.

In the illustrated preferred embodiments, the side-by-side virtual pages are tied together, such as in a table, where there are rows with data on one line in one page associated with data on one line of the other page. As such, the scrolling control 100 on the right side of the screen 64 will appropriately cause vertical scrolling through both virtual pages simultaneously. It should be understood, however, that the present invention could be used with displays in which the two displayed pages are not tied together in such a manner, in which case scrolling controls like control 100 could be provided on both sides of the screen 64, with one control working with one area 70 a and the other control working with the other area 72.

Further, in the preferred embodiments illustrated, the page display control 80 controls horizontal (side-to-side) resizing and scrolling between columns, which is most common given the tendency for data to be more frequently displayed in side-by-side vertical columns. In such a use, the control 100 described above is suitable as only one control is required for vertical scrolling of both areas 70, 72. However, it should be understood that the present invention could also be used in which the separating line is horizontal (i.e., separates pages disposed above and below one another). Still further, should more than two virtual pages be displayed on the screen 64 (e.g., should one virtual page be displayed in the upper half of the screen 64 and two other page be displayed in side-by-side quarter-screens therebeneath), the present invention could advantageously be used both at the bottom of the areas 70, 72 and at the side for scrolling and resizing all such page displaying areas.

It should also be recognized that it would be within the scope of the present invention to display the page display control 80 only when required (e.g., when more than one page is displayed). If a particular display had only one page (e.g., if touching one of the touch-pads 66 causes only one virtual page to be displayed, in which case "resizing" would not be necessary), then a control such as control 100 for controlling scrolling could be used in place of control 80 when such a display is active. Further, if the screen 64 were wide enough to display the entire width of the virtual page, then no control need be displayed at the bottom and that area could be used for additional display area for the virtual page. In such case, the control 80 of the present invention would again be displayed and active when two adjacent virtual pages are thereafter called up for display on the screen by the user.

Referring now specifically to the modified embodiment shown in FIG. 5, for convenience like elements are given the same reference numbers as in FIG. 4 (and a description of those elements is not repeated here), and similar but modified elements are given the same number with prime (') added.

Specifically, the bar indicators 94', 96' include end areas 110, 112, 114, 116 in which oppositely directed indicators or arrows are provided. the end areas 110 are touch responsive so that when tapped, they cause the device 60' to horizontally scroll the virtual pages in the associated areas 70, 72 a selected amount (i.e., a set number of pixels) for each tap. For example, tapping end area 110 would cause the virtual page in screen area 70 to move to the left, thereby displaying portions of the data on the right portion of the virtual page not previously displayed, whereas tapping end area 116 would cause the virtual page in screen area 72 to move to the right, thereby displaying portions of the data on the left portion of that virtual page not previously displayed.

Further, the device 60' is configured so that when the bar indicators 94', 96' are touched by a user between their end areas 110, 112 and 114, 116, the portion of the virtual display page shown in the associated area 70, 72 will also change in response to lateral movement of the user's touch. Thus, the virtual page may also be "dragged" to one side or the other to show different portions of the page according to the user's wish in essentially the same manner as described above with respect to the FIG. 4 embodiment.

It should thus now be seen that the present invention enables both resizing and scrolling in a practical, flexible, natural and intuitive manner. Further, such resizing and scrolling can be accomplished in a reliable manner, with touch-responsive areas large enough for use by all users while still taking minimal, narrow overall screen space. The present invention thus advantageously allows the user maximum flexibility to optimize the view of the data pages to best meet his needs.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

What is claimed is:

1. In a data storage device including a screen portion for visually displaying at least a part of two different virtual display pages of said data adjacent a separating line, said two virtual display pages when together adjacent said separating line being larger than said screen portion in a direction generally perpendicular to said separating line whereby only a portion of one of the virtual display pages is displayed in said screen portion, a display control structure comprising:

first and second touch-responsive resizing areas adjacent to and on opposite sides of the separating line with oppositely pointing indicators in said first and second resizing areas, said resizing areas when touched by a user causing said device to move the separating line between pages in the screen portion in the direction of the indicator in the touched resizing area; and a first scrolling area extending from said first resizing area in said generally perpendicular direction with a first bar indicator smaller than said first scrolling area in said generally perpendicular direction, said first bar indicator when touched by a user causing said device to move the portion of the one virtual display page displayed in the screen portion in response to movement of the user's touch in the generally perpendicular direction in the first scrolling area.

2. The improvement of claim 1, wherein said first bar indicator is spaced from opposite sides of said first scrolling area by amounts which are proportionate to the amounts of the associated virtual display page not displayed in said screen portion.

3. The improvement of claim 1, further comprising a second scrolling area extending from said second resizing area in said generally perpendicular direction with a second bar indicator smaller than said second scrolling area in said generally perpendicular direction, said second bar indicator when touched by a user causing said device to move the portion of the other virtual display page displayed in the screen portion in response to movement of the user's touch in the generally perpendicular direction in the second scrolling area.

4. The improvement of claim 1, wherein said first and second touch-responsive resizing areas move in response to movement of said separating line.

5. The improvement of claim 1, said first and second touch-responsive resizing areas when touched by a user further causing said device to move the separating line between pages in the visually displaying screen portion in response to movement of the user's touch in the generally perpendicular direction.

6. The improvement of claim 1, wherein said user touch is accomplished by physical contact of the user with the screen.

7. In a data storage device including a screen portion for visually displaying at least a part of two different virtual display pages of said data adjacent a separating line, said two virtual display pages when together adjacent said separating line being larger than said screen portion in a direction generally perpendicular to said separating line whereby only a portion of one of the virtual display pages is displayed in said screen portion, a display control structure comprising:

first and second touch-responsive resizing areas adjacent to and on opposite sides of the separating line with oppositely pointing indicators in said first and second resizing areas, said resizing areas when touched by a user causing said device to move the separating line between pages in the screen portion in the direction of the indicator in the touched resizing area;

a first scrolling area extending from said first resizing area in said generally perpendicular direction; and a first bar indicator in said first scrolling area having oppositely pointing indicators at opposite ends in said generally perpendicular direction, said first bar indicator when touched by a user causing said device to move the portion of the one virtual display page displayed in the screen portion in the direction of the pointing indicator of the bar indicator touched.

8. The improvement of claim 7, further comprising:

a second scrolling area extending from said second resizing area in said generally perpendicular direction; and a second bar indicator in said second scrolling area having oppositely pointing indicators at opposite ends in said generally perpendicular direction, said second bar indicator when touched by a user causing said device to move the portion of the other virtual display page displayed in the screen portion in the direction of the pointing indicator of the bar indicator touched.

9. The improvement of claim 7, wherein said first and second touch-responsive resizing areas move in response to movement of said separating line.

10. The improvement of claim 7, said first and second touch-responsive resizing areas when touched by a user further causing said device to move the separating line between pages in the visually displaying screen portion in response to movement of the user's touch in the generally perpendicular direction.

11. The improvement of claim 7, wherein said user touch is accomplished by physical contact of the user with the screen.

12. The improvement of claim 7, said first bar indicator when touched between its opposite ends by a user causing said device to move the portion of the one virtual display page displayed in the screen portion in response to movement of the user's touch in the generally perpendicular direction in the first scrolling area.

13. The improvement of claim 12, wherein said first bar indicator is spaced from opposite sides of said first scrolling area by amounts which are proportionate to the amounts of the associated virtual display page not displayed in said screen portion.

14. A data storage device comprising:

a memory for storing data displayable in at least two different virtual display pages;

a display screen including a portion adapted to display at least a portion of each of said two different virtual display pages adjacent one another at a separating line;

first and second touch-responsive resizing areas adjacent to and on opposite sides of the separating line with oppositely pointing indicators in said first and second resizing areas, said resizing areas when touched by a user causing said device to move the separating line between pages in the screen portion in the direction of the indicator in the touched resizing area; and a first scrolling area extending from said first resizing area in a direction generally perpendicular to said separating line with a first bar indicator in said first scrolling area, said first bar indicator when touched by a user causing said device to move the portion of the virtual display page displayed in the screen portion adjacent the first scrolling area in response to movement of the user's touch in the generally perpendicular direction in the first scrolling area.

15. The device of claim 14, wherein said first bar indicator is spaced from opposite sides of said first scrolling area by amounts which are proportionate to the amounts of the associated virtual display page not displayed in said screen portion.

16. The device of claim 14, further comprising a second scrolling area extending from said second resizing area in said generally perpendicular direction with a second bar indicator smaller in said second scrolling area, said second bar indicator when touched by a user causing said device to move the portion of the other virtual display page displayed in the screen portion in response to movement of the user's touch in the generally perpendicular direction in the second scrolling area.

17. The device of claim 14, wherein said first and second touch-responsive resizing areas move in response to movement of said separating line.

18. The device of claim 14, said first and second touch-responsive resizing areas when touched by a user further causing said device to move the separating line between pages in the visually displaying screen portion in response to movement of the user's touch in the generally perpendicular direction.

19. The device of claim 14, wherein said user touch is accomplished by physical contact of the user with the screen.

20. The device of claim 14, wherein said device is a hand-held portable communicator.

21. A data storage device comprising:

a memory for storing data displayable in at least two different virtual display pages;

a display screen including a portion adapted to display at least a portion of each of said two different virtual display pages adjacent one another at a separating line;

first and second touch-responsive resizing areas adjacent to and on opposite sides of the separating line with oppositely pointing indicators in said first and second resizing areas, said resizing areas when touched by a user causing said device to move the separating line between pages in the screen portion in the direction of the indicator in the touched resizing area;

a first scrolling area extending from said first resizing area in said generally perpendicular direction; and a first bar indicator in said first scrolling area having oppositely pointing indicators at opposite ends in said generally perpendicular direction, said first bar indicator when touched by a user causing said device to move the portion of the one virtual display page displayed in the screen portion in the direction of the pointing indicator of the bar indicator touched.

22. The device of claim 21, further comprising:

a second scrolling area extending from said second resizing area in said generally perpendicular direction; and a second bar indicator in said second scrolling area having oppositely pointing indicators at opposite ends in said generally perpendicular direction, said second bar indicator when touched by a user causing said device to move the portion of the other virtual display page displayed in the screen portion in the direction of the pointing indicator of the bar indicator touched.

23. The device of claim 21, wherein said first and second touch-responsive resizing areas move in response to movement of said separating line.

24. The device of claim 21, said first and second touch-responsive resizing areas when touched by a user further causing said device to move the separating line between pages in the visually displaying screen portion in response to movement of the user's touch in the generally perpendicular direction.

25. The device of claim 21, wherein said user touch is accomplished by physical contact of the user with the screen.

26. The device of claim 21, wherein the device is a hand-held portable communicator.

27. The device of claim 21, said first bar indicator when touched between its opposite ends by a user causing said device to move the portion of the one virtual display page displayed in the screen portion in response to movement of the user's touch in the generally perpendicular direction in the first scrolling area.

28. The device of claim 27, wherein said first bar indicator is spaced from opposite sides of said first scrolling area by amounts which are proportionate to the amounts of the associated virtual display page not displayed in said screen portion.

* * * * *